United States Patent [19]
Rumsey

[11] Patent Number: 5,560,280
[45] Date of Patent: Oct. 1, 1996

[54] REPAIRABLE TAMPER-PROOF BRAKE

[75] Inventor: Donald Rumsey, Nampa, Id.

[73] Assignee: Overland Brakes, Inc., Nampa, Id.

[21] Appl. No.: 413,343

[22] Filed: Mar. 30, 1995

[51] Int. Cl.⁶ ............................. F01B 19/00; B21D 39/00
[52] U.S. Cl. ............................. 92/48; 92/128; 92/130 R; 403/348; 029/521; 029/888.06
[58] Field of Search ............................. 92/48, 63, 169.1, 92/128, 98 R, 130 R, 130 A, 130 B; 403/348, 349; 29/521, 888.06

[56] References Cited

U.S. PATENT DOCUMENTS

| | | |
|---|---|---|
| 4,181,065 | 1/1980 | Benjamin et al. ............... 92/48 X |
| 4,850,263 | 7/1989 | Rumsey . |
| 5,025,709 | 6/1991 | Miyazaki ............... 403/348 X |
| 5,067,391 | 11/1991 | Choinski et al. . |
| 5,193,432 | 3/1993 | Smith . |
| 5,205,205 | 4/1993 | Choinski et al. . |
| 5,263,403 | 11/1993 | Choinski et al. . |
| 5,285,716 | 2/1994 | Thompson . |
| 5,311,809 | 5/1994 | Choinski et al. . |
| 5,315,918 | 5/1994 | Pierce ............... 403/348 X |
| 5,409,256 | 4/1995 | Gordon et al. ............... 403/348 X |

Primary Examiner—Hoang Nguyen
Attorney, Agent, or Firm—Charles H. Thomas

[57] ABSTRACT

A pneumatic spring brake is improved so as to be not only tamper proof but repairable as well. Such a brake is formed of a spring chamber head and adapter head, both of which define rigid mating rims that are disposed in mutual, longitudinal alignment and in face-to-face relationship. The rims compress the periphery of a spring brake diaphragm therebetween. The rim of one of the heads is fabricated with a plurality of lugs thereon separated from each other by circumferentially spaced gaps therebetween. The rim of the other of the spring brake heads is provided with a corresponding number of radially outwardly projecting flanges having widths smaller than the gaps between the lugs. The flanges project radially outwardly from the head on which they are formed and into channels formed in the lugs on the other head. The flanges are thereby held in registration with the lugs by the compression of the periphery of the spring brake diaphragm between the mating rims of the heads. The spring brake heads can thereby be disassembled only with the aid of a heavy duty press capable of developing at least about six thousand pounds per square inch. However, with such equipment the spring brake housing components can be separated to allow repair and replacement of internal parts.

14 Claims, 8 Drawing Sheets

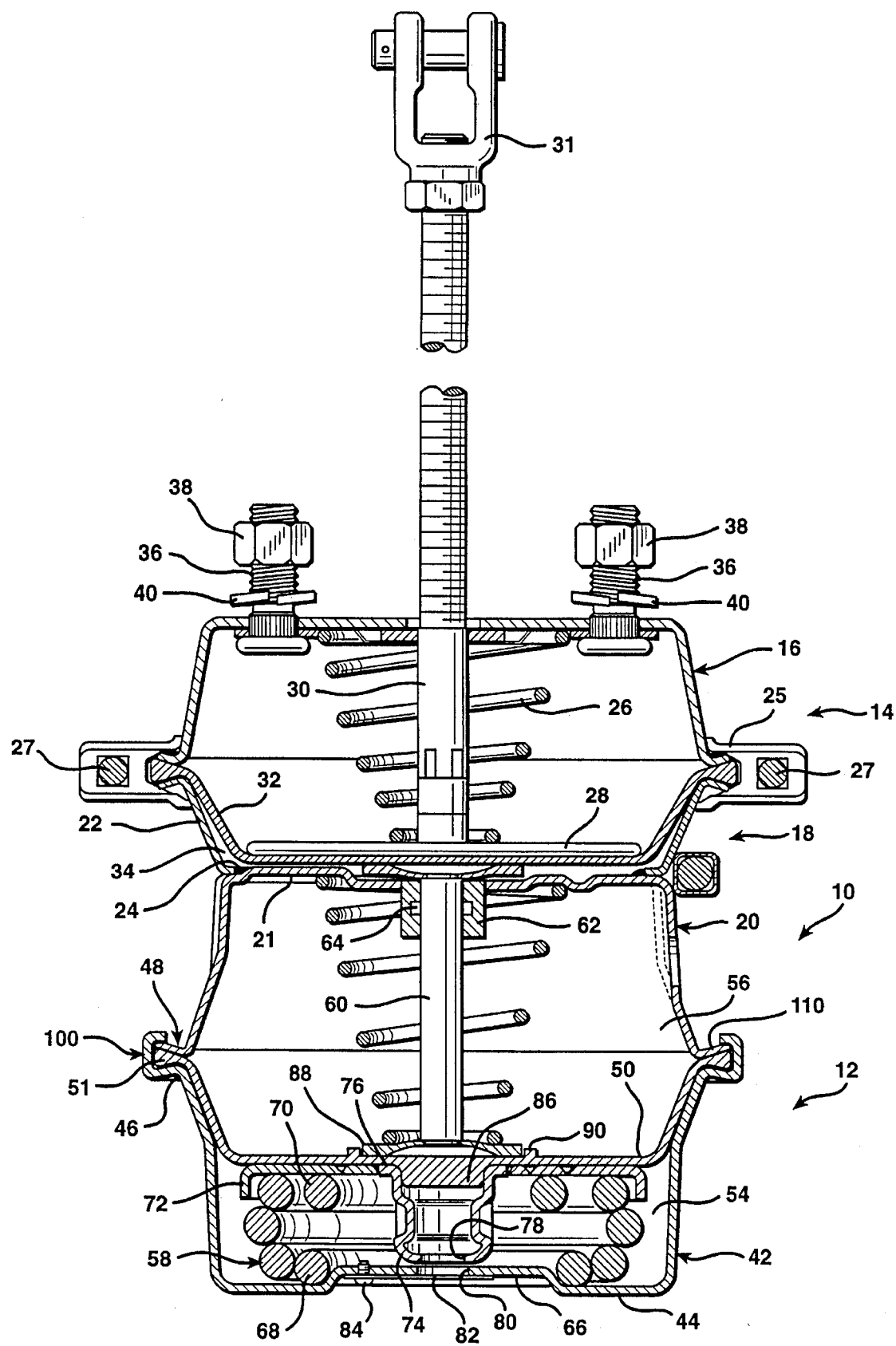

REPAIRABLE TAMPER-PROOF BRAKE

BACKGROUND OF THE INVENTION

1. Field of the Invention

The present invention relates to an improved pneumatically controlled spring brake of the type utilized in heavy duty vehicles, such as commercial truck tractors and trailers.

2. Description of the Prior Art

Pneumatic spring brakes are widely utilized in the trucking industry. A typical conventional pneumatic spring brake has both a service brake portion for slowing and stopping a truck or trailer moving under normal conditions, and an emergency or parking brake portion. The service brake portion is operated by means of a foot valve located in the vehicle cab. The service brake portion of the pneumatic spring brake applies the brakes to the wheels of a truck or trailer on the highway using pneumatic pressure to act against a diaphragm located within the service brake housing. Air under pressure is utilized to activate the service brake portion.

In a typical pneumatic spring brake air is maintained in a pneumatic reservoir or tank carried on board the vehicle at a pressure on the order of about 100 psi. The reservoir provides 3,000 pounds of thrust against the 30 square inch effective surface area of the service brake diaphragm. Pneumatic pressure is maintained by an on board air compressor. If a failure develops in the pneumatic air supply system, however, the service brake will not function. In this event the emergency brake will thereupon operate automatically.

In a double diaphragm spring brake the emergency brake, which also serves as the parking brake, is mounted in tandem with the service brake. The actuation force of the emergency brake is applied to the brake mechanism on the vehicle wheel through the service brake push rod. Application of the emergency brake is entirely mechanical. The actuating force for the emergency brake is applied by a heavy coil power spring located in a spring chamber of the pneumatic spring brake. This heavy power spring is normally maintained in check by air pressure acting on the opposite side of the spring brake diaphragm in the brake housing while the vehicle is in operation.

The power spring within the spring brake portion of the device applies the brake on a wheel to which it is connected when there is a loss of air pressure to the spring chamber of the emergency brake. Such a loss of pressure can occur either through a break or failure in the air line that applies pressure to the spring brake chamber, or by intentional exhaustion of air from the parking brake chamber, as when the truck or trailer is parked. In this situation the spring brake serves as a parking brake.

When compressed within the separable brake housing portions which historically have been joined together by semicircular clamping rings, the compressed power spring contains a tremendous amount of potential energy. The power spring is quite heavy and typically weighs three pounds or more. The power spring is compressed to a linear length of less than three inches from an original uncompressed length in an extended condition of from nine to twelve inches. Consequently, the compressed spring in the pneumatic spring brake housing can be extremely dangerous, especially to persons who are unaware of the danger or are unfamiliar with the structure and manner of interaction of the component parts of the spring brake. Even when pressure in the emergency brake housing is exhausted, the spring is held in a compressed condition so as to exert a force on the housing of from 750 pounds to 1750 pounds, if an unskilled person or a person unfamiliar with pneumatic spying brakes attempts to take the spring brake apart for repair, the power spring will literally explode from the housing and can cause profound bodily injury, and even death.

In some conventional spring brakes, the clamping ring which joins the separable housing portions of the spring brake is constructed of two generally semicircular clamping ring elements having radially outwardly turned attachment ears at their ends. These semicircular elements are bolted together by bolts extending through openings in the ears. Each of the housing portions is formed with a radially outwardly directed lip or rim. These outwardly directed lips or rims are pressed toward each other throughout their perimeters.

When nuts are tightened on the bolts joining the clamping ring ears the distance of separation between the juxtaposed attachment ears is reduced as the bolt assemblies draw the clamp ring elements toward each other. This causes the clamping ring elements to firmly grip and secure the lips of the separable emergency brake housing portions of the spring brake together. The lips or rims of the two adjacent housing portions are entrapped and held together by the clamping ring. The clamping ring encircles the housing portions at their mutual interface. However, any person with only the most rudimentary of workshop tools can unthread the nuts from the clamping ring bolts and thereby inadvertently release the tremendous power of the coil spring.

One approach toward reducing the potential for injury when a spring brake is disassembled is to "cage" the spring prior to disassembly so that the spring exerts no pressure against the spring brake diaphragm. Caging is performed by inserting a special bolt through an access hole in the end of the spring housing. The bolt is inserted concentrically through the coils of the spring, and into an opening in a pressure plate. The bolt is equipped with a transverse cross pin at the end which is inserted through the pressure plate. The pressure plate includes a slot to admit the cross pin therethrough.

Once the cross pin clears the pressure plate the bolt is turned so that the cross pin is brought into contact with a recess in the underside of the pressure plate. A nut is threadably engaged on the threaded end of the bolt which protrudes from the access hole in the housing. The nut is tightened down to bear against the housing adjacent the access hole. Tightening of the nut at the exposed end of the bolt draws the pressure plate toward the end of the housing in which the access hole is formed, thereby retracting the spring pressure plate and the coiled spring away from the diaphragm.

Caging of the spring can be quite dangerous to persons who are uninformed as to the construction of a spring brake however, particularly if the pressure plate has corroded or the spring has broken. Furthermore, it is not uncommon for springs to break, due to fatigue, especially when a plug has fallen from the access hole and corrosion has accelerated fatigue. Consequently, the disassembly of a spring brake entails considerable risk of bodily injury and damage.

Another approach toward reducing the potential for injury is to construct the emergency brake portion of the pneumatic spring brake as a permanently sealed unit. Unlike the service brake portion, access to the emergency brake portion is desirable only very infrequently. While the service brake diaphragm is worked back and forth many thousands of times, and will wear our and must be replaced, the emergency brake portion is used far less often. Therefore, by permanently sealing the emergency brake portion with the heavy spring mounted therein, the danger of injury by disassembly of that portion of the spring brake by unskilled personnel or persons lacking knowledge of the construction and dangers of such disassembly is avoided.

One way of permanently sealing the emergency brake portion of the spring brake is to fabricate the emergency brake head with a skirt or flange that can be wrapped over a corresponding mating flange or lip of the portion of an adapter forming the other part of the emergency brake housing once all the components of the emergency brake have been installed within the emergency brake chamber. The emergency brake is constructed of a pair of concave shell-like housing portions which fit together. In the trade the emergency brake head portion is often referred to as the spring chamber and forms one end of the emergency brake cavity. The adapter forms the other end of the emergency brake cavity as well as a portion of the service brake cavity.

The flange or skirt of the emergency brake head may be spun or forced over and wrapped underneath the facing lip of the adapter using a press or by other means so that the two lips or flanges of the emergency brake head and the adapter are permanently crimped together. The outer lip of the emergency brake head is wrapped over and captures the inner lip of the adapter. The periphery of the rubber, disk-shaped emergency brake diaphragm is entrapped between the crimped lips or flanges of the emergency brake head and the adapter. The crimping operation permanently secures the periphery of the emergency brake diaphragm between the emergency brake head and the adapter and forms a pneumatic seal that pneumatically isolates the emergency brake chamber containing the emergency brake spring from the opposite side of the emergency brake cavity formed by the adapter.

By locking the portions of the emergency brake housing together in a permanent fashion such as this, the heavy power spring is permanently encapsulated within the emergency brake chamber of the spring brake housing. Thus, the emergency brake portion of the spring brake cannot be disassembled so that the risk of bodily injury which might otherwise result from tampering is greatly alleviated. One such spring brake of this type is sold by Overland Brakes, Inc., located in Nampa, Id. as the "Black Max" spring brake unit. The construction of this spring brake is described in U.S. Pat. No. 4,850,263.

Another approach which has been utilized to permanently seal the emergency brake housing portion of a vehicle spring brake is to weld the lips of the mating emergency brake housing shell portions together throughout their circumferences. Such a system is described in U.S. Pat. No. 5,285,716. However, this technique has disadvantages in that the welding process is quite time consuming because a welding bead must be formed throughout at least a major portion of the circumference of the spring brake housing. Furthermore, due to the prolonged exposure to heat that is required to create the lengthy weld, there is a considerable likelihood of damage to the rubber emergency brake diaphragm that is gripped between the lips of the shells. Thus, this technique is relatively slow, costly, and can easily result in a permanently sealed, but defective emergency brake unit.

Still another approach to creating a sealed brake unit is to provide an encircling band of U-shaped cross section that is initially split at one or more locations. The band is spread apart and moved longitudinally along the length of the spring brake housing sections until it resides in radial alignment with the projecting lips of the spring brake chamber head and the adapter head. The band is then closed so that the ends of the band reside in abutment. The ends of the band are then fusion welded together so that the band forms an inextendable hoop that encircles and grips the radially projecting lips of the housing components.

One difficulty with all tamper-proof spring brakes that have heretofore been devised is that they are not only tamper proof but they cannot be repaired. Indeed, if the spring within the unit should break or become misaligned or should the spring brake diaphragm become ruptured, the entire unit must be discarded as there is no practical way of separating the housing components without destroying the structural integrity of the spring brake.

SUMMARY OF THE INVENTION

A primary object of the present invention is to provide a pneumatic spring brake for an automotive vehicle which is not only tamper proof, but which is repairable as well. The improved spring brake construction of the present invention provides a system for sealing the spring brake chamber head and the adapter head of a pneumatic spring brake together in a manner which will prevent inexperienced and unknowledgeable persons from separating these components. Nevertheless, these components can be separated with specialized equipment which only a competent, authorized facility having the requisite knowledge for dealing with and repairing spring brakes would be likely to possess.

With the appropriate equipment, the spring chamber head and adapter head of the automotive vehicle spring brake of the invention can be safely separated from each other to allow the repair and replacement of internal components. Moreover, once any defective parts have been replaced and any necessary repairs performed, the spring chamber head and the adapter head can be reassembled utilizing the same equipment and once again interlocked to prevent unauthorized tampering with the unit.

Another and related object of the invention is to provide a tamper-proof automotive vehicle spring brake which can be safely disassembled to allow replacement of internal components which may have been determined to be potentially hazardous. In present practice, conventional temper-proof spring brakes cannot be upgraded. Once the brake is manufactured and the housing components permanently sealed together, it is impossible to upgrade any of the internal components which may, after the manufacture of the brake, be determined to be potentially defective or hazardous. With conventional spring brakes it may be necessary to scrap an entire spring brake assembly if even a single, inexpensive internal component is determined to be potentially hazardous. With the system of the present invention, on the other hand, a sealed spring brake unit can be safely unsealed and disassembled to allow potentially defective parts to be replaced with upgraded or improved replacement parts.

Still a further object of the invention is to provide a pneumatic spring brake in which the housing components can only be disassembled using equipment that provides a controlled restraint on the powerful, compressed energy in a compressed coil spring in a spring brake. The necessary equipment utilized in disassembling the housing components directly opposes and constrains the powerful spring of the spring brake from extending in an uncontrolled manner. Specifically, a heavy duty press, typically a hydraulic press is necessary for the disassembly of the spring braking housing components. The operative elements of such a press directly oppose the force of the power spring. Therefore, even if the power spring has not been properly caged, the press will prevent it from being explosively released.

In one broad aspect the present invention may be considered to be an improvement in a pneumatic spring brake for an automotive vehicle having a housing formed of a spring chamber head and an adapter head, both of which define rigid, mating rims that are disposed in mutual longitudinal alignment and in face-to-face relationship and which compress the periphery of a spring brake diaphragm therebetween. According to the improvement of the invention the rim of one of the heads is fabricated with a plurality of lugs thereon separated from each other with circumferentially spaced gaps therebetween. The lugs each have a radially inwardly-facing channel defined therewithin. The rim of the other of the heads is formed with a corresponding plurality of radially outwardly projecting flanges having widths smaller than the circumferentially spaced gaps between the lugs. The thicknesses of the flanges are less than the widths of the channels in the lugs. The outwardly projecting flanges project radially outwardly from the other of the heads and into the channels. The flanges are held in registration in the channels by the compression of the periphery of the diaphragm between the mating rims of the heads.

It is important for the pneumatic spring brake of the invention to be provided with a sufficient number of lugs and corresponding flanges so that the diaphragm is compressed relatively uniformly about the circumference of its periphery. For this reason the head bearing the lugs is preferably formed with at least ten lugs. In the preferred embodiments of the invention the spring brake is provided with fourteen such lugs. Also, the flanges must necessarily be no greater in width than the circumferential spacing of the lugs from each other. However, the flanges are preferably at least a great as the width of the lugs, and in the preferred embodiment of the invention are slightly greater in width than the lugs.

The periphery of the diaphragm is compressed throughout its entire circumference by the inner margins of the mating rims. Preferably also, however, the periphery of the diaphragm projects further radially outwardly beyond the inner margins of the rims and into the channels in the lugs. The periphery of the spring brake diaphragm is thereby compressed between the lugs and the flanges.

In another broad aspect the invention may be considered to be an improvement in a pneumatic spring brake for an automotive vehicle having a housing formed of a pair of concave shells both having surrounding rims that face each other so as to define a cavity between the shells, a diaphragm disposed within the cavity and projecting in between the rims laterally throughout its circumference to divide the cavity into at least two chambers, and a coil spring disposed in one of the chambers and compressed between one of the shells and the diaphragm.

According to the improvement of the invention a first of the rims defines a plurality of rigid lugs formed from the structure of the rim of the first shell. The lugs are located at circumferentially spaced distances from each other. Each of the lugs includes an outwardly extending portion projecting radially outwardly from the first shell, a longitudinally extending portion projecting from the outwardly extending portion longitudinally toward a second of the shells, and an inwardly extending portion projecting radially inwardly from the longitudinally extending portion toward the second of the shells in spaced separation from the outwardly projecting portion. An interstice is thereby defined between the outwardly and inwardly extending portions of each lug.

A second of the rims defines a plurality of rigid flanges formed in radial alignment with the lugs of the first rim. These flanges have circumferential widths less than the circumferentially spaced distances between the lugs. The flanges project radially outwardly from the second rim into the interstices. The periphery of the diaphragm is compressed between the first and second rims, thereby holding the flanges in contact with the inwardly extending portions of the lugs.

In still another broad aspect the invention may be considered to be a method of sealing a tamper-proof, repairable spring brake for an automotive vehicle. According to the method a spring chamber head and an adapter head are fabricated such that both of these heads define rigid, mating rims. The rim of a first of the heads is formed with a plurality of lugs thereon separated from each other by circumferentially spaced gaps therebetween. The lugs each have a radially inwardly facing channel defined therewithin. The rim of a second of the heads is formed with a plurality of radially outwardly projecting flanges having widths smaller than the circumferentially spaced gaps between the lugs and thicknesses less than the widths of the channels in the lugs.

A power spring is mounted in the spring chamber head and a return spring and push rod are mounted in the adapter head. The mating rims of the spring chamber head and adapter head are then longitudinally aligned with each other with the outwardly projecting flanges in longitudinal alignment with the circumferentially space gaps between the lugs. A spring brake diaphragm is then position between the heads such that the periphery of the diaphragm resides in longitudinal alignment between the rims.

A longitudinal compressive force is then applied to the heads to press the heads together so that the flanges pass longitudinally between the lugs and so that the periphery of the spring brake diaphragm is compressed between the rims. At least one of the heads is turned in angular rotation relative with the other until the flanges reside in the channels in radial alignment with the lugs.

The longitudinal force is then removed from the heads, whereupon the periphery of the diaphragm remains partially compressed between the rims and exerts a sufficient longitudinal force against the heads to prevent angular movement therebetween in the absence of an externally applied force acting to compress the rims further together.

The longitudinal force required to compress the diaphragm sufficiently so as to allow the flanges to advance sufficiently in a longitudinal direction until they are in the same plane as the channels is far in excess of the force that can be developed without a very powerful press. Indeed, the longitudinal force that is applied to the heads in order to press them together sufficiently so that the flanges reside in a coplanar relationship with the channels should be great enough to create a pressure of at least six thousand and preferably eight thousand pounds per square inch between the rims.

While the pneumatic spring brake heads can be constructed such that the periphery of the diaphragm is compressed between the rims radially inwardly of the lugs and the flanges, in a preferred construction the periphery of the diaphragm extends into the gap and is held compressed between the flanges and the outwardly extending portions of the lugs. The periphery of the diaphragm thereby resides in longitudinal alignment between the lugs and the flanges. During the step of compression the periphery of the diaphragm is compressed between the lugs and the flanges.

In a conventional construction of a pneumatic spring brake the wall of a spring chamber head is provided with laterally spaced pneumatic bleed holes therein. These existing bleed holes in the wall of the spring chamber head allow air to escape when the pneumatic brake is pressurized and the diaphragm is forced toward the closed end of the spring chamber head to compress the power spring therein. The bleed holes allow the air to escape from the spring chamber head as the power spring is compressed therewithin.

The existing bleed holes provide an ideal means for engaging the spring chamber head to turn it in rotation relative to the adapter head. In properly equipped repair facilities a spanner wrench may be employed to twist the spring chamber head relative to the adapter head once the two heads have been compressed together to bring the flanges in longitudinal alignment with the channels defined in the lugs. By using the spanner wrench as a lever the spring chamber head is rotated a distance sufficient to change the angular orientation of the flanges from positions between the lugs to positions in which the flanges reside within the channels defined in the lugs. Typically the extent of rotation is about twelve and a half of thirteen angular degrees where fourteen lugs and fourteen flanges are provided about the periphery of the spring chamber head and adapter head, respectively.

Once the compressive force between the two heads is released, the tight fit of the compressed adapter periphery and the compression of the periphery of the diaphragm between the rims act in directions tending to force the two heads apart. However, since the flanges are entrapped within the channels of the lugs, the two heads cannot move apart. Rather, the flanges are pressed tightly against the radially inwardly extending portions of the lugs with such a powerful force that the friction between the lugs and the flanges is so great that the two heads can no longer be moved in rotation relative to each other. The lugs and flanges are strong enough to withstand this force and do not deform under the intense pressure thus applied.

The invention may be described with greater clarity and particularity by reference to the accompanying drawings.

DESCRIPTION OF THE DRAWINGS

FIG. 9 is a side sectional view of a complete pneumatic spring brake constructed according to the invention.

DESCRIPTION OF THE EMBODIMENT AND IMPLEMENTATION OF THE METHOD

Figure 1:
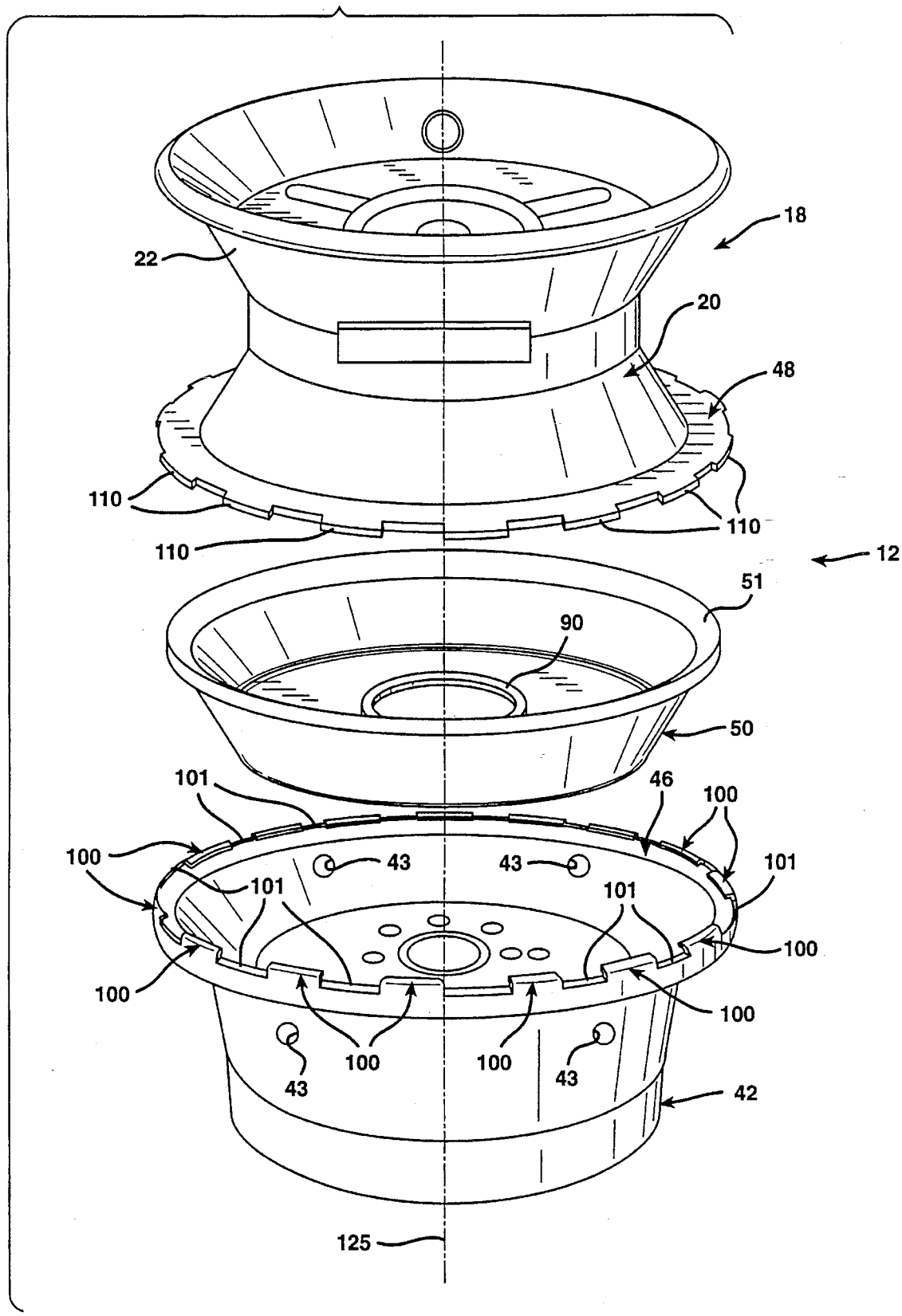
FIG. 1 is an exploded perspective view illustrating the spring chamber head, spring chamber diaphragm, and adapter head of a pneumatic spring brake according to the invention, prior to assembly.

FIG. 9 illustrates a completed pneumatic spring brake 10 constructed according to the invention. The pneumatic spring brake 10 includes many of the conventional features and components of prior art tamper-proof spring brakes such as the spring brake depicted and described in prior U.S. Pat. No. 4,850,263. The pneumatic spring brake 10 is of the type known as a dual diaphragm spring brake and is adapted for use with a heavy duty automotive vehicle, such as a truck tractor or trailer. The pneumatic spring brake 10 is fastened to the vehicle wheel drum (not shown) by bolts 36 which are secured by nuts 38 and washers 40.

The pneumatic spring brake 10 includes both a spring brake portion 12 and a service brake portion 14. The service brake portion 14 of the spring brake 10 is of a conventional construction and includes a concave, shell-like service brake head 16 and an adapter 18. The adapter 18 is formed in two parts and includes a shell-like or bowl-like spring brake adapter head portion 20 and a service brake chamber portion 22 shaped generally in the form of a frustum of a cone. The service brake chamber portion 22 is welded to the spring brake adapter head portion 20 about its entire circumference by an annular weld 24.

A service brake spring 26 acts against a bearing plate 28 to force a service brake push rod 30 toward the spring brake portion 12 of the pneumatic spring brake 10. The service brake push rod 30 terminates in a yoke 31 that is operatively coupled to the brake elements that act against the vehicle wheels (not shown). The spring brake head 16 and the service brake chamber portion 22 of the adapter 18 both have radial lips held together by a conventional, encircling clamping ring 25 employing clamping bolts 27. A service brake pressure chamber 34 may be defined as the enclosure bounded by the spring brake diaphragm 32, the service brake chamber portion 22, and the transverse end 21 of the adapter head portion 20 of the adapter 18.

The bearing plate 28 acts against the seevice brake diaphragm 32 when pneumatic pressure is applied to the pressure chamber 34. The push rod 30 will thereupon be forced away from the spring brake portion 12 of the pneumatic spring brake 10.

The spring brake portion 12 of the pneumatic spring brake 10 is formed of an enclosing structure that includes the spring brake adapter head 20 and a spring chamber head 42. The spring chamber head 42 is a shell-like or bowl-like structure having a transverse closed end 44 and an opposite open end formed by an annular rim 46. The annular rim 46 of the spring chamber head 42 is secured to the mating, annular rim 48 of the spring brake adapter head 20 in a novel manner, hereinafter to be described.

A reinforced, heavy rubber spring brake diaphragm 50 is disposed within the confines of the spring brake portion 12 of the pneumatic spring brake 10. The rigid, mating rims 46 and 48 of the spring chamber head 42 and the spring brake adapter head 20, respectively, are disposed in mutual longitudinal alignment and in face-to-face relationship. The rims 46 and 48 compress the periphery 51 of the spring brake diaphragm 50 therebetween.

Together the spring chamber head 42 and the spring brake adapter head 20 define a cavity therewithin. The spring brake diaphragm 50 is disposed within the cavity to divide it into a spring chamber 54 and a spring brake pressure chamber 56. A heavy coil, power spring 58 is disposed within the spring brake chamber 54. A push rod 60 is disposed with the spring brake pressure chamber 56 and extends through an axial opening in the transverse end wall 21 of the spring brake adapter head 20 and into the pressurized service brake pressure chamber 34.

The push rod 60 is in coaxial alignment with both the power spring 58 and the service brake push rod 30. The spring brake push rod 60 slides through an annular bearing 62, located in the opening defined in the transverse end 21 of the spring brake adapter head 20. The bearing 62 is constructed of a relatively soft metal, such as bronze, and includes an annular recess in its interior wall in which an O-ring seal 64 is seated.

The transverse end 44 of the spring chamber head 42 is formed with a central, axial, generally circular indentation 66 therein. The indentation 66 extends axially into the spring chamber 54 coaxially within the end coil 68 of the power spring 58 which bears directly against the end wall 44 of the shell forming the spring chamber head 42. The axial indentation 66 thereby laterally stabilizes the end coil 68 of the power spring 58 and performs the function of a centering post. The end coil 68 therefore cannot shift laterally relative to the end wall 44 of the spring chamber head 42, but is instead held in precise axial alignment with the push rod 60.

The opposite end coil 70 of the power spring 58 bears against an annular spring plate 72 which is formed of metal and which is interposed between the power spring 58 and the spring brake diaphragm 50. A circular, central, axial opening is defined in the spring plate 72 to receive a longitudinally extending spring plate centering core 74. The spring plate centering core 74 has a radially, outwardly projecting flange 76 that resides in bearing relationship against the spring plate 72 and a central axial opening 78 at its opposite end.

The transverse end wall 44 of the spring chamber head 42 also has an aligned, central axial opening 80 that is normally closed by a closure plate 82 held in place by a machine screw 84. The axially aligned openings 78 and 80 allow insertion of a conventional spring "caging" tool which engages the spring plate centering core 74 to draw it close to the end wall 44 of the spring chamber head 42, as illustrated in FIG. 9, even in the absence of pressure within the spring brake pressure chamber 56. The power spring 58 is thereby held in the fully compressed condition illustrated in FIG. 9 by the caging tool during the initial assembly of the pneumatic spring brake 10, and during any disassembly of the spring brake portion 12.

The spring brake diaphragm 50 is of a conventional construction and is formed of layers of rubber which encapsulate fabric mesh within. The spring brake diaphragm 50 is formed with a central, axial disc-shaped protrusion 86 which extends into the axial opening of the spring plate 72 and into registration with the spring plate centering core 74. The protrusion 86 into the chamber 54 laterally stabilizes the end coil 70 of the power spring 58 by preventing the spring plate 72 from shifting laterally across the surface of the spring brake diaphragm 58. The protrusion 86 acts as a short centering post for the spring plate 72. The spring brake pressure chamber 56 is located on the opposite side of the spring brake diaphragm 50. The spring brake portion 12 is further provided with an annular disc-shaped, metal push rod sear 88 which is laterally confined within an annular raised ring 90 on the spring brake diaphragm 50.

The components of the pneumatic spring brake 10 heretofore described are all conventional. The novelty of the present invention resides in the construction of the pneumatic spring brake 10 in such a manner as to be not only tamper proof, as with prior spring brakes such as that described in U.S. Pat. No. 4,850,263, but repairable as well. To this end the spring brake portion 12 is constructed of a housing formed of a pair of concave shells, namely the spring chamber head 42 and the spring brake head 20 of the adapter 18.

The spring chamber head 42 and the spring brake adapter head 20 are both formed with surrounding annular rims 46 and 48, respectively. The rims 46 and 48 face each other so as to define a cavity between the shells 20 and 42. The spring brake diaphragm 50 is disposed within this cavity and projects laterally throughout its circumference in between the rims 46 and 48 to divide the cavity into two chambers, namely the spring chamber 54 and the spring brake pressure chamber 56. The power spring 58 is disposed in the spring chamber 54 and is compressed between the shell forming the spring chamber head 42 and the spring brake diaphragm 50.

A first of the rims, namely the rim 46, defines a plurality of rigid lugs 100 projecting from the structure of the spring chamber head 42. There are fourteen of these lugs 100 located at circumferentially spaced distances from each other, as best illustrated in FIGS. 1 through 4. Each of the lugs 100 is formed from the structure of the rim 46 of the spring chamber head 42. Each of the lugs 100 includes an outwardly extending portion 102 that projects radially outwardly from the frustconical side wall of the spring chamber head 42, a longitudinally extending portion 104 projecting from the outwardly extending portion 102 longitudinally toward the other shell formed by the spring brake adapter head 20, and an inwardly extending portion 106 projecting radially inwardly from the longitudinally extending portion 104. The inwardly extending portions 106 extend toward the shell formed by the spring brake adapter head 20 in spaced separation from the outwardly projecting portions 102 of the lugs 100. Each lug 100 thereby defines a channel 108 which delineates an interstice between the outwardly extending portion 102 and the inwardly extending portion 106 thereof.

Figure 8:
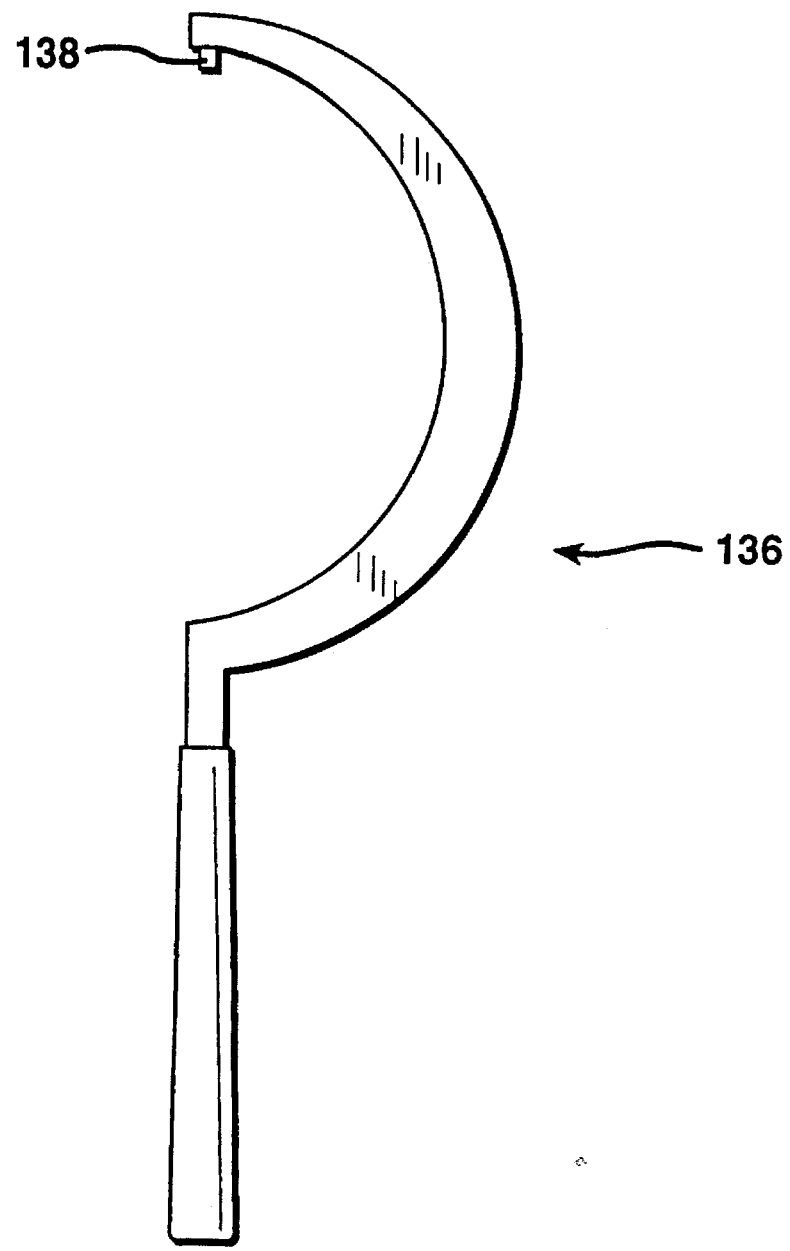
FIG. 8 is a plan view illustrating the spanner wrench employed in a properly equipped repair facility.

The other rim, namely the rim 48 of the spring brake adapter head 20 defines a plurality of rigid flanges 110 which, in the complete and assembled pneumatic spring brake 10 depicted in FIG. 8, are in circumferential alignment with the lugs 100 of the rim 46. The flanges 110 have circumferential widths less than the circumferentially spaced distances formed by the gaps 101 between the lugs 100. The flanges 110 project radially outwardly from the second rim 48 into the interstices defined by the channels 108. The peripheral margin 51 of the spring brake diaphragm 50 is compressed between the first rim 46 and the second rim 48. This compression holds the flanges 110 in contact with the wall of the inwardly extending portions 106 bounding one side of each channel 108.

The pneumatic spring brake 10 may be constructed of a size such that the maximum diameter of the spring brake portion 12, as measured between the outer surfaces of the longitudinal portions 104 of the lugs 100, is 8.060 inches. This distance is indicated at 112 in FIG. 2. The distance between the radially innermost faces of the radially inwardly extending portions 106 of the lugs 100, as measured across the diameter of the pneumatic spring brake 110, is preferable 7.586 inches. Therefore, each of the radially inwardly extending portions 106 of the lugs 100 extends inwardly a distance of 0.237 inches.

In the preferred embodiment of the invention there are fourteen lugs 100 spaced uniformly around the rim 46. Each of the lugs 100 is 0.8386 inches in width, as measured from one gap 101 to the next. The gaps 101 are of a slightly greater width than the lugs 100. In the embodiment illustrated the width of each gap 101 is preferably 0.8986 inches.

The flanges 110 extend radially outwardly a distance of 0.125 inches from the remaining structure of the rim 48. The flanges 110 must be of a width slightly less than the width of the gaps 101. Preferably, the flanges 110 are each 0.8786 inches in width so that they will clear the structure of the lugs 100 as they are pressed toward the spring chamber head 42 in radial alignment with the gaps 101.

Figure 6:
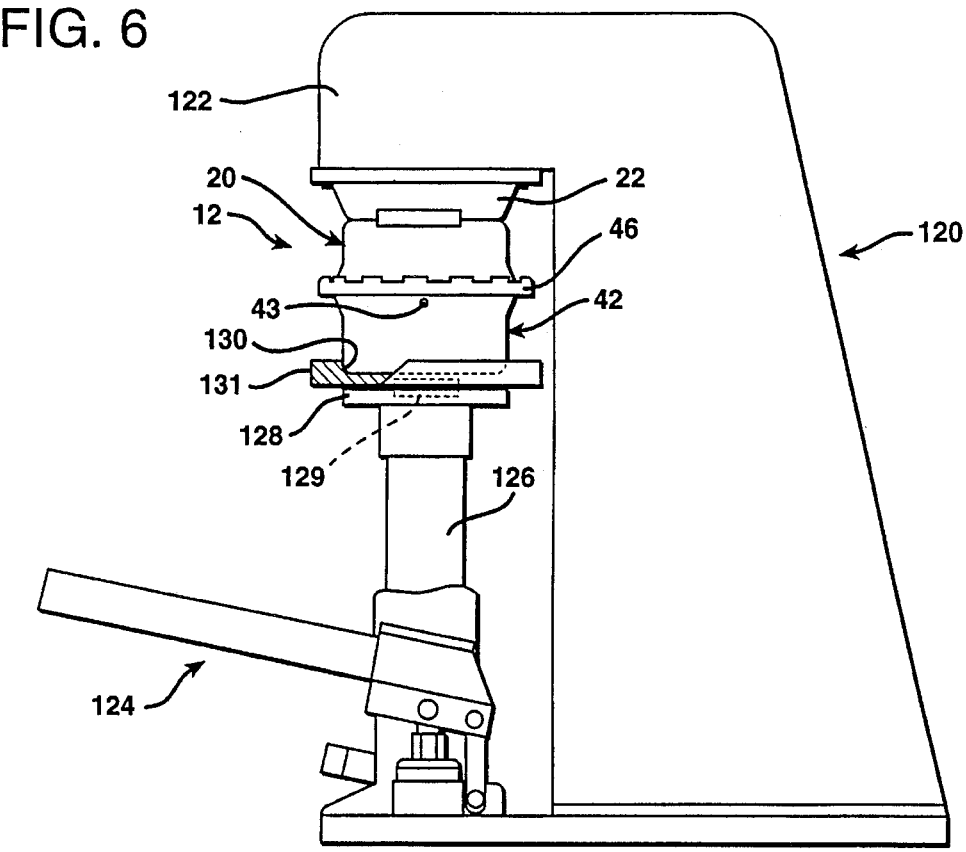
FIG. 6 is a side elevational view of the adapter heads of FIGS. 1–5 in a compression press as they appear while being coupled to each other and as they appear when being decoupled from each other.
Figure 7:
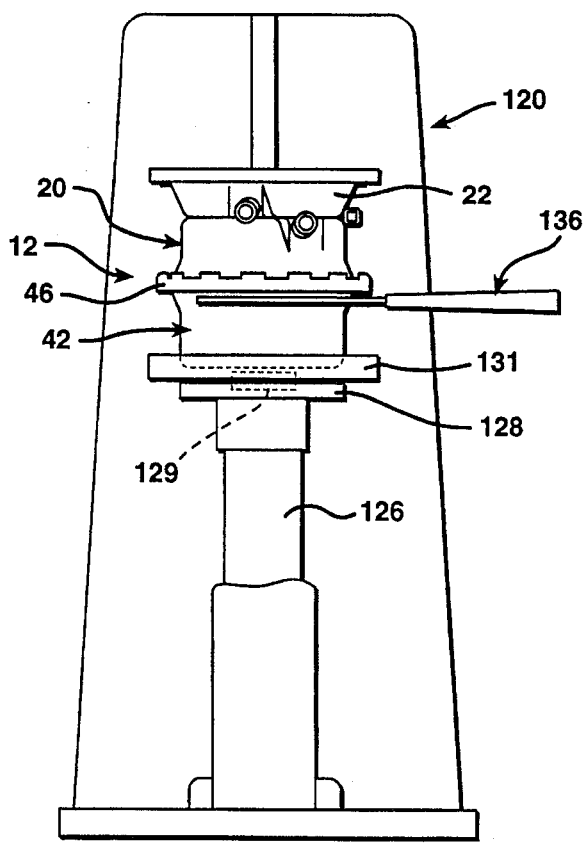
FIG. 7 is a front elevational view of FIG. 6 showing the spring brake chamber head being turned in rotation relative to the adapter head.

FIGS. 6 and 7 illustrate the apparatus which may be employed in the method of sealing the tamper-proof, repairable pneumatic spring brake 10. FIG. 6 illustrates a high-pressure press 120 which includes a rigid, immovable, downwardly facing bearing pad 122 and a hydraulic jack assembly indicated at 124. The hydraulic jack assembly 124 is provided with an upright pressure post 126 having an upwardly facing jack pedestal 128. A bearing 129 is seated in the center of the upper face of the jack pedestal 128. A spring brake mounting pad 131 is carried atop the bearing 129. The mounting pad 131 is provided with a concave, central axial, circular positioning depression 130 therein which snugly receives the end wall 44 of the spring chamber head 42 and maintains the spring chamber head 42 centered atop the hydraulic jack post 126.

Figure 2:
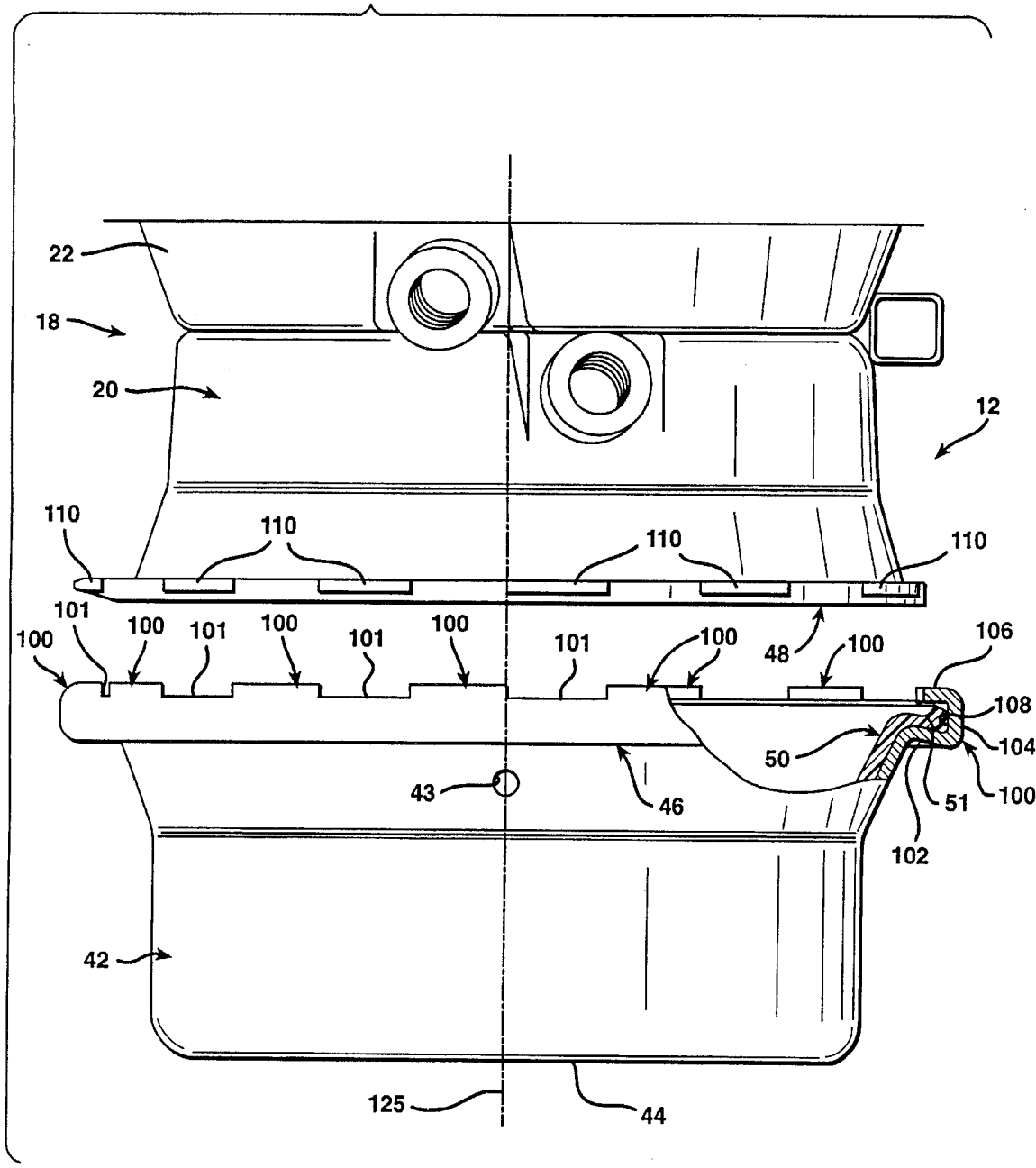
FIG. 2 is an elevational view, partially broken away, of the components of FIG. 1 showing the spring brake diaphragm in longitudinal alignment with the spring chamber head.

To assemble the spring brake portion 12 of the pneumatic spring brake 10 the power spring 58 is first caged in a conventional manner. The spring chamber head 42 is then placed on the mounting pad 131 in the positioning depression 130. The diaphragm 50 is positioned between the spring chamber adapter head 20 and the spring chamber head 42 such that the periphery 51 of the diaphragm 50 resides in longitudinal alignment between the rims 46 and 48. The adapter 18 is then lowered onto the spring chamber head 42 from above in axial alignment therewith as shown in FIG. 2. The annular rims 46 and 48 reside in face-to-face disposition on opposites sides of the diaphragm 50. The periphery 51 of the diaphragm 50 extends radially outwardly beyond the heels of the rims 46 and 48 and into the gaps defined by the channels 108 in the lugs 100.

Figure 3:
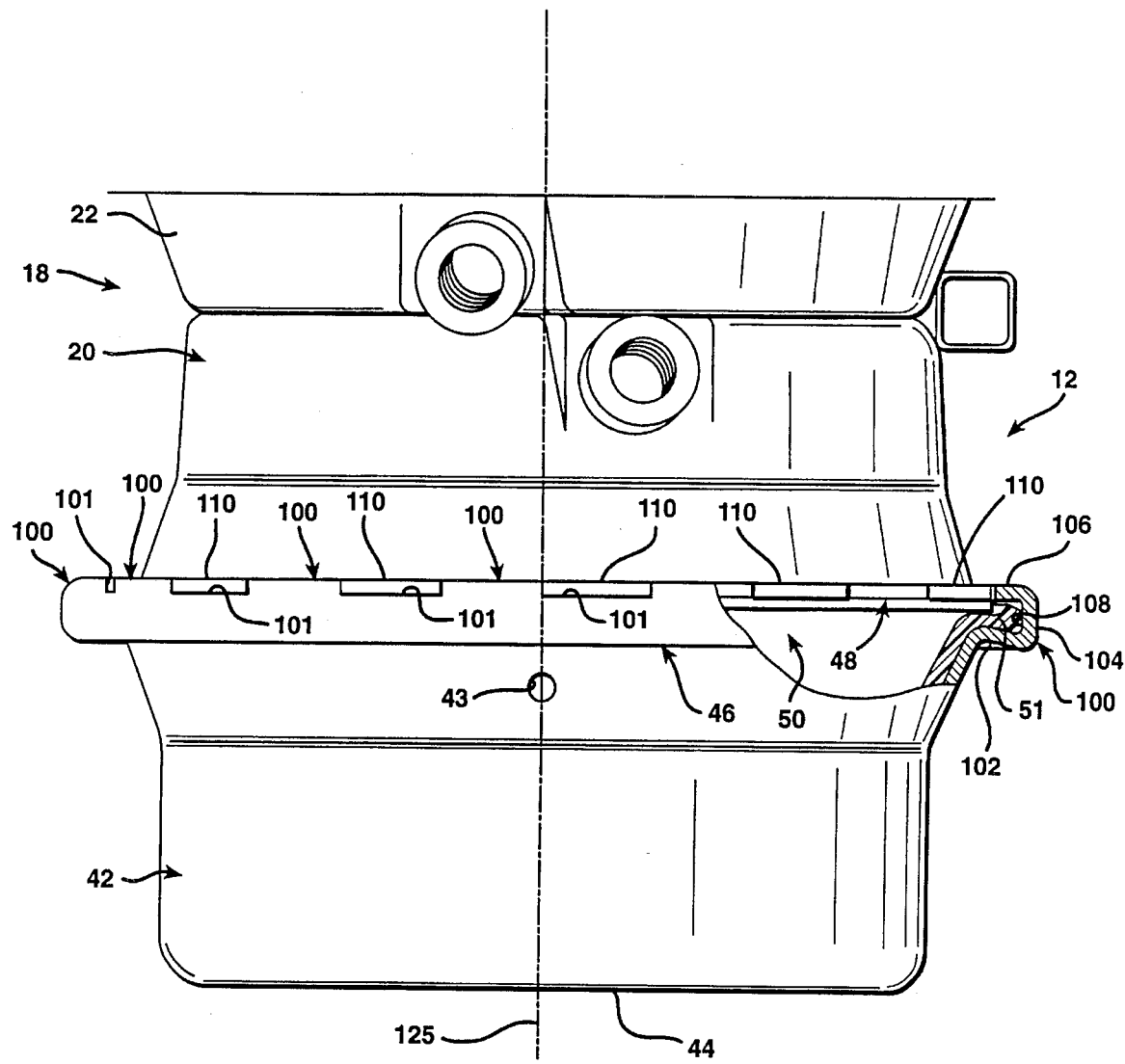
FIG. 3 is a side elevational view, partially broken away, showing the adapter seated atop the spring chamber head prior to coupling the adapter head to the spring chamber head.
Figure 4:
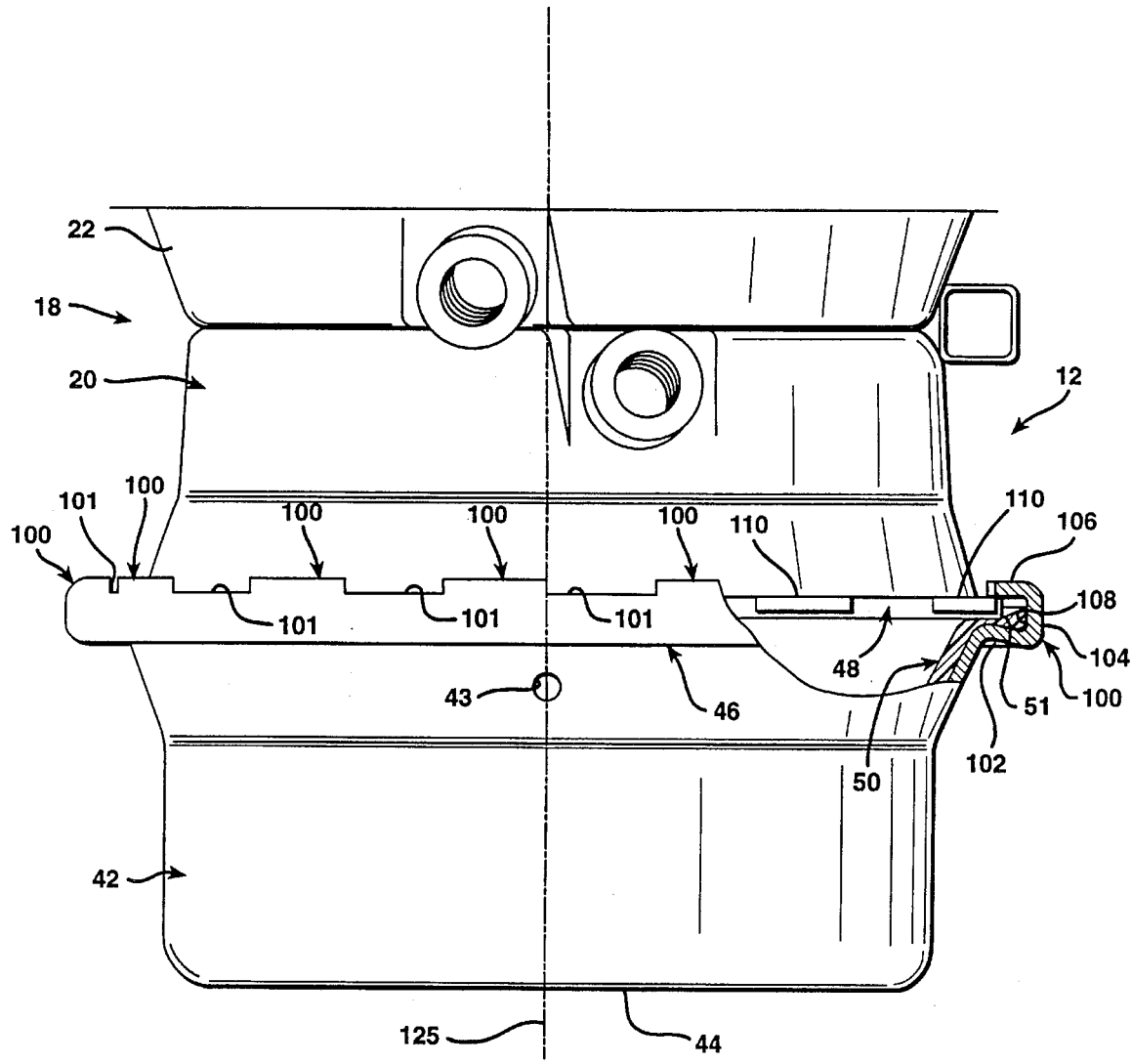
FIG. 4 is a elevational view, partly broken away, showing the spring chamber head and the adapter head pressed together with the diaphragm therebetween prior to turning the heads in rotation relative to each other.
Figure 5:
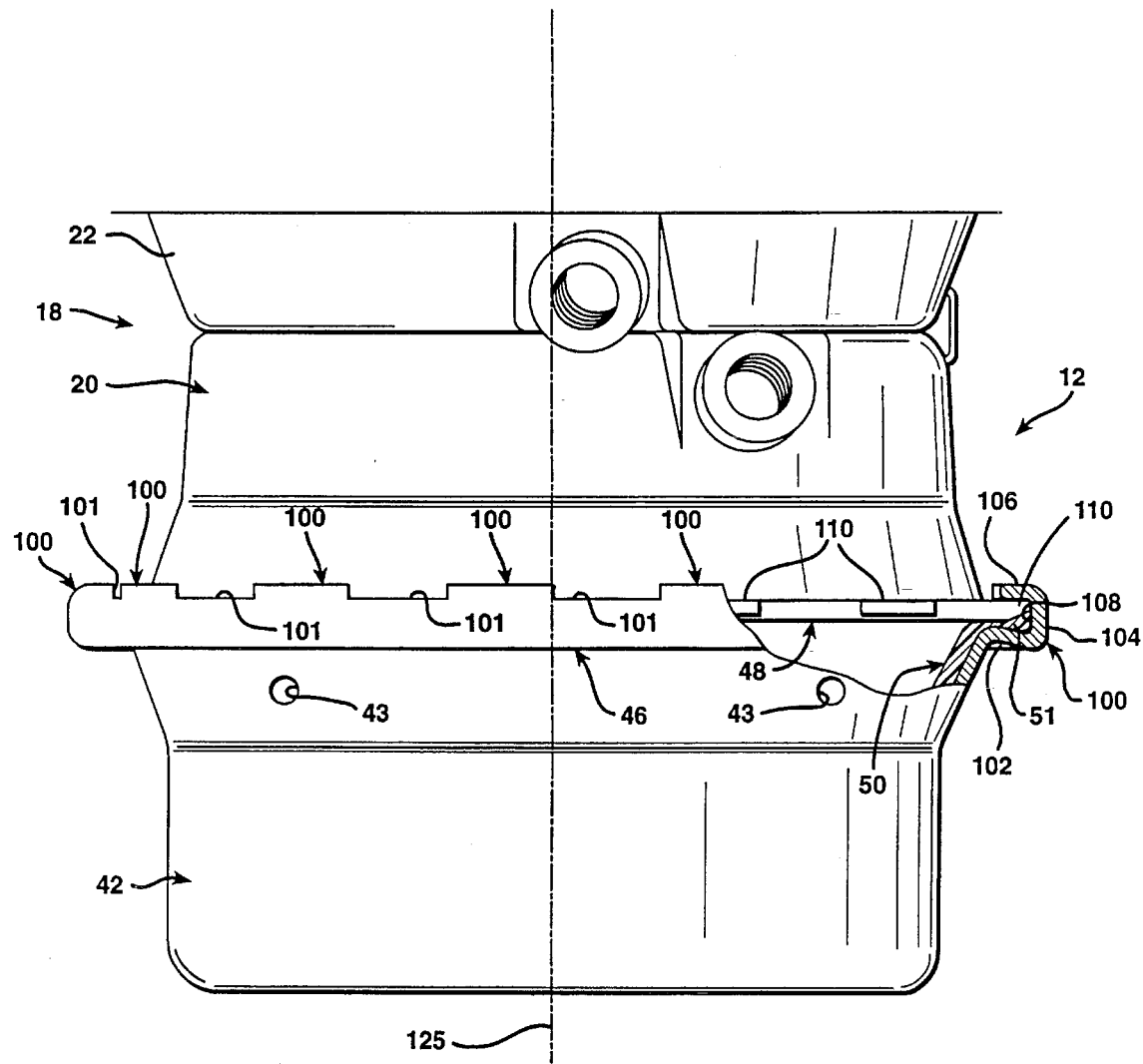
FIG. 5 is a side elevational view, partly broken away, showing the spring chamber head and adapter head pressed together and turned in rotation relative to each other a distance of twelve and a half angular degrees.

Hydraulic pressure is then applied to the hydraulic jack 124, thereby forcing the pressure post 126 upwardly. The adapter 18 and the spring chamber head 42 are thereby forced together from the position of FIG. 2 through the position shown in FIG. 3 and subsequently to the position shown in FIG. 4. When the adapter 18 and spring chamber head 42 are brought together toward each other the radially outwardly projecting flanges 110 pass through the gaps 101 as shown in FIG. 3.

The hydraulic jack 124 is operated to apply a longitudinal compressive force of at least six and preferably eight thousand pounds per square inch to the heads 20 and 42 to press them together. The flanges 110 on the adapter head 20 pass longitudinally between the lugs 100 on the spring chamber head 42. As the spring chamber head 42 is pressed upwardly toward the spring chamber adapter head 20, the flanges 110 press downwardly and compress the periphery 51 of the spring chamber diaphragm 50 until the radially inwardly extending portions 106 of the lugs 100 have been pressed upwardly longitudinally beyond the upper surfaces of the flanges 110. The periphery 51 of the spring diaphragm 50 is compressed between the rims 46 and 48. Since the diaphragm periphery 51 extends radially outwardly into the channels 108, it is compressed between the radially outwardly projecting portions 102 of the lugs 100 and the downwardly facing surfaces of the flanges 110.

At this point a spanner wrench 136 having an engagement tooth 138 is employed to turn the spring chamber head 42 in angular rotation relative to the spring chamber adapter head 20. The spanner wrench 136 is shown in isolation in FIG. 8. The spanner wrench 136 is used as a lever and is pulled to rotate the spring chamber head 42 and the mounting pad 131 in rotation upon the bearing 129 about the vertical axis of alignment 125, shown in FIGS. 2–5, through an arcuate distance of between about 12.5 and 13 degrees. To turn the spring chamber head 42 in rotation the tooth 138 of the spanner wrench 136 is engaged in one of the pneumatic bleed holes 43 of the spring chamber head 42 while the adapter head 20 is held immobile. The spanner wrench 136 is then oriented in a horizontal plane and pulled to turn the spring chamber head 42 in rotation about the vertical axis 125. The spring chamber head 42 is turned in rotation through an arc relative to the spring brake adapter head 20 until the flanges 110 enter the channels 108 and reside in radial alignment with the lugs 100.

The spanner wrench 136 will only be able to rotate the spring chamber head 42 if a longitudinal compressive force of at least six thousand pounds per square inch is applied to force the adapter 18 and spring chamber head 42 together. Only in the presence of such a force can the spring chamber head 42 be rotated relative to the spring brake adapter head 20 using the spanner wrench 136. The hard rubber periphery 51 of the spring brake diaphragm 50 is compressed only slightly, but the extent of compression is sufficient to allow the flanges 110 to clear the undersides of the radially inwardly extending portions 106 of the lugs 100.

The longitudinal force of the hydraulic jack 124 is then reduced and totally removed from the spring chamber head 42 and spring brake adapter head 20. When this occurs the periphery 51 of the spring brake diaphragm 50 can expand slightly in a direction parallel to the axis 125, but still remains partially compressed between the rims 46 and 48. Therefore, the periphery 51 of the spring brake diaphragm 50 still exerts a sufficient longitudinal force against the heads 42 and 20 to prevent any angular movement between the spring chamber head 42 and the spring brake adapter head 20 in the absence of an externally applied force acting to compress the rims 46 and 48 further together. In this condition the flanges 110 are held in registration with the lugs 100 by the compression of the periphery 51 of the spring brake diaphragm 50 between the mating rims 46 and 48 of the spring brake portion 12 of the pneumatic spring brake 10.

Without a high-pressure press 120 having the capability of exerting a longitudinal compressive force of at least six thousand pounds per square inch so as to partially relieve the force with which the compressed periphery 51 of the spring brake diaphragm 50 urges the flanges 110 into contact with the radially inwardly extending portions 106 of the lugs 100, the frictional force between the flanges 110 and the radially inwardly extending portions 106 of the lugs 100 cannot be overcome if one attempts to rotate the spring chamber head 42 relative to the adapter 18. Such rotational movement is impossible even if one possess a spanner wrench 136. The spanner wrench 136 can be utilized to rotate the spring chamber head 42 relative to the spring brake adapter head 20 only if a compressive force of at least six thousand pounds per square inch is exerted between the adapter 18 and the spring chamber head 42.

Small automotive repair shops do not process high-power presses of the type indicated at 120, and thus will not be able to disassemble the component casing parts of the spring brake portion 12 of the pneumatic spring brake 10. Likewise, ordinary garage mechanics who lack the requisite knowledge of spring brake construction and skill to work on them will also be unable to separate the adapter 18 from the spring chamber head 42. As a consequence, the pneumatic spring brake 10 does constitute a tamper-proof structure.

On the other hand, fully equipped automotive vehicle repair facilities having a hydraulic press 120 and equipped with a manufacturer-provided mounting pad 130 and spanner wrench 136 will have the necessary facilities for separating the component housing heads 18 and 42 of the spring brake portion 12 of the pneumatic spring brake 10 to allow repair, replacement and upgrading of internal components thereof. As a consequence, unlike prior tamper-proof spring brakes, the improved pneumatic spring brake 10 according to the invention is repairable by knowledgeable and fully equipped personnel trained to deal safely with automotive spring brakes.

Undoubtedly, numerous variations and modifications of the invention will become readily apparent to those familiar with automotive vehicle spring brakes. For example, although in the preferred embodiment the periphery 51 of the spring brake diaphragm 50 extends radially beyond the radial inner portions of the rims 46 and 48 and into the channels 108, the rims can be designed so that the spring brake diaphragm periphery does not extend radially outwardly into the channels. It is sufficient if the periphery terminates shoot of the lugs 100 as long as it is compressed between the rims 46 and 48. Other modifications to the spring brake construction and alternative implementations of the method are also possible. Accordingly, the scope of the invention should not be construed as limited to the specific embodiments and manner of implementation illustrated and described.

I claim:

1. In a pneumatic spring brake for an automotive vehicle having a housing formed of a spring chamber head and an adapter head, both of which define rigid, mating rims that are disposed in mutual longitudinal alignment and in face-to-face relationship and which compress the periphery of a spring brake diaphragm therebetween, the improvement wherein said rim of one of said heads is fabricated with a plurality of lugs thereon separated from each other by circumferentially spaced gaps therebetween and wherein said lugs each have a radially outwardly projecting lug portion, a longitudinally projecting lug portion, and a radially inwardly projecting lug portion, thereby defining a radially inwardly facing channel located radially inwardly from said longitudinally projecting lug portion and between said radially outwardly and radially inwardly projecting lug portions, and said rim of said other of said heads is formed with a corresponding plurality of radially outwardly projecting flanges having widths smaller than said circumferentially spaced gaps between said lugs and thicknesses less than the widths of said channels in said lugs, whereby said outwardly projecting flanges project radially outwardly from said other of said heads and into said channels and said flanges and said periphery of said spring brake diaphragm are held compressed between said radially outwardly and radially inwardly projecting lug portions by a pressure of at least six thousand pounds per square inch, and are thereby held in registration with said lugs by the compression of said periphery of said diaphragm between said mating rims of said heads.

2. A pneumatic spring brake according to claim 1 wherein at least ten of said lugs are formed on said rim of said one of said heads.

3. A pneumatic spring brake according to claim 1 fabricated with fourteen of said lugs as aforesaid.

4. A pneumatic spring brake according to claim 1 wherein said flanges are at least as great in width as said lugs.

5. A pneumatic spring brake according to claim 1 wherein said periphery of said diaphragm projects into said channels and is compressed between said lugs and said flanges.

6. In a pneumatic spring brake for an automotive vehicle having a housing formed of a pair of concave shells both having surrounding rims that face each other so as to define a cavity between said shells, a diaphragm disposed within said cavity and projecting in between said rims laterally throughout its circumference to divide said cavity into at least two chambers, and a coil spring disposed in one of said chambers and compressed between one of said shells and said diaphragm, the improvement wherein a first of said rims defines a plurality of rigid lugs formed from the structure of said rim of said first shell, said lugs being located at circumferentially spaced distances from each other, each of said lugs including an outwardly extending portion projecting radially outwardly from said first shell, a longitudinally extending portion projecting from said outwardly extending portion longitudinally toward a second of said shells, and an inwardly extending portion projecting radially inwardly from said longitudinally extending portion toward said second of said shells in spaced separation from said outwardly projecting portion, thereby defining interstices between said outwardly and inwardly extending portions of said lugs, and wherein a second of said rims defines a plurality of rigid flanges formed in radial alignment with said lugs of said first rim and having circumferential widths less than said circumferentially spaced distances between said lugs, and said flanges project radially outwardly from said second rim into the aforesaid interstices and the periphery of said diaphragm is compressed between said first and second rims with a pressure of at least six thousand pounds per square inch, thereby holding said flanges in contact with said inwardly extending portions of said lugs.

7. A pneumatic spring brake according to claim 6 wherein said periphery of said diaphragm extends into said interstices and is held compressed between said flanges and said outwardly extending portions of said lugs.

8. A pneumatic spring brake according to claim 6 further comprising at least ten lugs and the same number of flanges constructed as aforesaid.

9. A method of sealing a tamper-proof, repairable spring brake for an automotive vehicle comprising:

fabricating a spring chamber head and an adapter head such that both of said heads define rigid, mating rims wherein the rim of a first of said heads is formed with a plurality of lugs thereon separated from each other by circumferentially spaced gaps therebetween and wherein said lugs each have a radially inwardly facing channel defined therewithin, and wherein the rim of a second of said heads is formed with a plurality of radially outwardly projecting flanges having widths smaller than said circumferentially spaced gaps between said lugs and thicknesses less than the widths of said channels in said lugs, mounting a power spring in said spring chamber head and a return spring and push rod in said adapter head, longitudinally aligning said mating rims with each other with said outwardly projecting flanges in longitudinal alignment with said circumferentially spaced gaps between said lugs, positioning a spring brake diaphragm between said heads such that the periphery of said diaphragm resides in longitudinal alignment between said rims, applying a longitudinal compressive force of at least six thousand pounds per square inch to said heads to press said heads together so that said flanges pass longitudinally between said lugs and so that said periphery of said spring brake diaphragm is compressed between said rims, turning at least one of said heads in angular rotation relative to the other of said heads until said flanges reside in such channels in radial alignment with said lugs, and removing said longitudinal force from said heads, whereupon said periphery of said diaphragm remains partially compressed between said rims and exerts a sufficient longitudinal force against said heads to prevent angular movement therebetween in the absence of an externally applied force acting to compress said rims further together.

10. A method according to claim 9 wherein there are at least ten lugs and ten flanges as aforesaid and further comprising turning said at least one of said heads in angular rotation no more than about eighteen degrees.

11. A method according to claim 9 wherein there are fourteen lugs and fourteen flanges as aforesaid and further comprising turning said at least one of said heads in angular rotation about twelve and one-half degrees.

12. A method according to claim 9 wherein said longitudinal force is applied to create a pressure of eight thousand pounds per square inch.

13. A method according to claim 9 wherein said periphery of said diaphragm resides in longitudinal alignment between said lugs and said flanges, and further comprising compressing said periphery of said diaphragm between said lugs and said flanges.

14. A method according to claim 9 wherein said spring chamber head is provided with laterally spaced pneumatic bleed holes therein and further comprising engaging a tool in said spring chamber pneumatic bleed holes and rotating said tool relative to said adapter head while holding said adapter head immobile during application of said longitudinal compressive force to thereby turn said spring chamber head in rotation relative to said adapter head.

* * * * *